US011841833B2

(12) United States Patent
Powell (10) Patent No.: US 11,841,833 B2
(45) Date of Patent: Dec. 12, 2023

(54) FILE REORGANIZATION (71) Applicant: Kyndryl, Inc., New York, NY (US)

(72) Inventor: James D. Powell, Tucson, AZ (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/579,372

(22) Filed: Jan. 19, 2022

(65) Prior Publication Data
US 2023/0229635 A1 Jul. 20, 2023

(51) Int. Cl.
G06F 16/17 (2019.01)
G06F 16/16 (2019.01)
G06F 16/27 (2019.01)
G06F 16/178 (2019.01)

(52) U.S. Cl.
CPC .......... G06F 16/178 (2019.01); G06F 16/16 (2019.01); G06F 16/273 (2019.01)

(58) Field of Classification Search
CPC ....... G06F 16/178; G06F 16/273; G06F 16/16
See application file for complete search history.

(56) References Cited

U.S. PATENT DOCUMENTS

| | | | |
|---|---|---|---|
| 8,818,955 B2 | 8/2014 | Barsness et al. | |
| 9,280,570 B2 | 3/2016 | Pruner | |
| 9,881,049 B2 | 1/2018 | Barber et al. | |
| 10,083,192 B2 | 9/2018 | Konik et al. | |
| 2014/0006725 A1* | 1/2014 | Shiomi | G06F 3/067 711/149 |
| 2015/0135192 A1* | 5/2015 | Takahashi | G06F 9/4843 718/105 |
| 2015/0227586 A1* | 8/2015 | Li | G06F 9/5088 707/769 |
| 2016/0140137 A1* | 5/2016 | Konik | G06F 16/162 707/692 |
| 2018/0081728 A1* | 3/2018 | Choi | G06F 9/4881 |
| 2022/0404987 A1* | 12/2022 | Sakuma | G06F 3/0685 |

FOREIGN PATENT DOCUMENTS

CN 111427902 7/2020

OTHER PUBLICATIONS

Mohan, "IBM's Relational DBMS Products: Features and Technologies", 1993, ACM SIGMOD Record 22.2, Data Base Technology Institute, IBM Almaden Research Center, San Jose, CA 95120, 4 pages.
Mell et al., "The NIST Definition of Cloud Computing", NIST, Special Publication 800-145, Sep. 2011, 7 pages.
Mosharraf et al., "Improving Query Execution Performance in Big Data using Cuckoo Filter", 2018, IEEE International Conference on Big Data (Big Data), IEEE, 6 pages.
Hannum et al., "HASQL: A Method of Masking System Failures", Mar. 26-29, 2019, Proceedings of the 22nd International Conference on Extending Database Technology (EDBT), 4 pages.

* cited by examiner

*Primary Examiner* — Hares Jami
(74) *Attorney, Agent, or Firm* — Dan Housley; Andrew M. Calderon; Calderon Safran & Cole P.C.

(57) ABSTRACT

A method includes executing, by a computing device, a reorganization command within an environment; monitoring, by the computing device, unprocessed replication transactions within the environment; determining, by the computing device, whether the unprocessed replication transactions exceed a threshold; and pausing, by the computing device, the executing the reorganization command in response to determining the unprocessed replication transactions exceed the threshold.

18 Claims, 6 Drawing Sheets

FILE REORGANIZATION

BACKGROUND

Aspects of the present invention relate generally to computing servers and, more particularly, to file reorganization.

Database servers such as mainframes and other computing systems tend to have relatively large files. Examples of these files include files for business applications.

SUMMARY

In a first aspect of the invention, there is a computer-implemented method including: executing, by a computing device, a reorganization command within an environment; monitoring, by the computing device, unprocessed replication transactions within the environment; determining, by the computing device, whether the unprocessed replication transactions exceed a threshold; and pausing, by the computing device, the executing the reorganization command in response to determining the unprocessed replication transactions exceed the threshold.

In another aspect of the invention, there is a computer program product including one or more computer readable storage media having program instructions collectively stored on the one or more computer readable storage media. The program instructions are executable to: execute a reorganization command within an environment; monitor replication transactions within the environment during the executing the reorganization command; determine whether there are unprocessed replication transactions from the monitoring; determine whether the unprocessed replication transactions exceed a threshold; and continue the executing the reorganization command in response to determining the unprocessed replication transactions do not exceed the threshold.

In another aspect of the invention, there is system including a processor, a computer readable memory, one or more computer readable storage media, and program instructions collectively stored on the one or more computer readable storage media. The program instructions are executable to: execute a reorganization command within an environment; monitor unprocessed replication transactions within the environment; determine whether the unprocessed replication transactions exceed a threshold; pause the executing the reorganization command in response to determining the unprocessed replication transactions exceed the threshold; and continue the executing the reorganization command in response to determining the unprocessed replication transactions does not exceed the threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to servers and, more particularly, to file reorganization. According to aspects of the invention, a system reorganizes records of physical files within servers by executing reorganization commands. In embodiments, the system uses replication software application programming interfaces (APIs) to monitor file replication activities within the servers. In response to unprocessed file replication activities exceeding a threshold, the system pauses execution of the reorganization commands within the servers so that computing resources are available for file replication activities. In this manner, implementations of the invention allow for the reorganization of physical files without interrupting file replication activities.

In embodiments, the systems and processes allow for reorganizing physical files in a high-availability environment without requiring a system outage and without impacting data replication performance. In embodiments, the processes include, for a set of physical files being replicated in a high-availability environment, executing a command (e.g., reorganize physical file member (RGZPFM)) to reorganize the physical files so as to move physical files that have been marked as deleted. In embodiments, the processes further include determining that an unprocessed transaction count for replication exceeds a threshold. In embodiments, the processes include, based on the unprocessed transaction count for replication exceeding the threshold, pausing execution of the command.

Implementations of the invention provide improvements to computing technologies by reorganizing physical files without requiring a system outage and without impacting file replication activities. Specifically, systems and processes reorganize records of physical files within servers by executing RGZPFM commands. In embodiments, the RGZPFM commands allow for the clearing out of deleted records from the physical files within the servers by moving records marked for deletion to the end of the physical file. In embodiments, the system uses replication software application programming interfaces (APIs) to monitor file replication activity. In response to unprocessed file replication activities exceeding a threshold, the system pauses execution of the RGZPFM commands within the servers so that computing resources are available for file replication activities. Further, removing deleted records can improve performance of applications which read a file sequentially. Accordingly, the systems and processes improve computing technologies by clearing out deleted records from files from the servers without interrupting file replication activity, thereby improving the performance of applications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
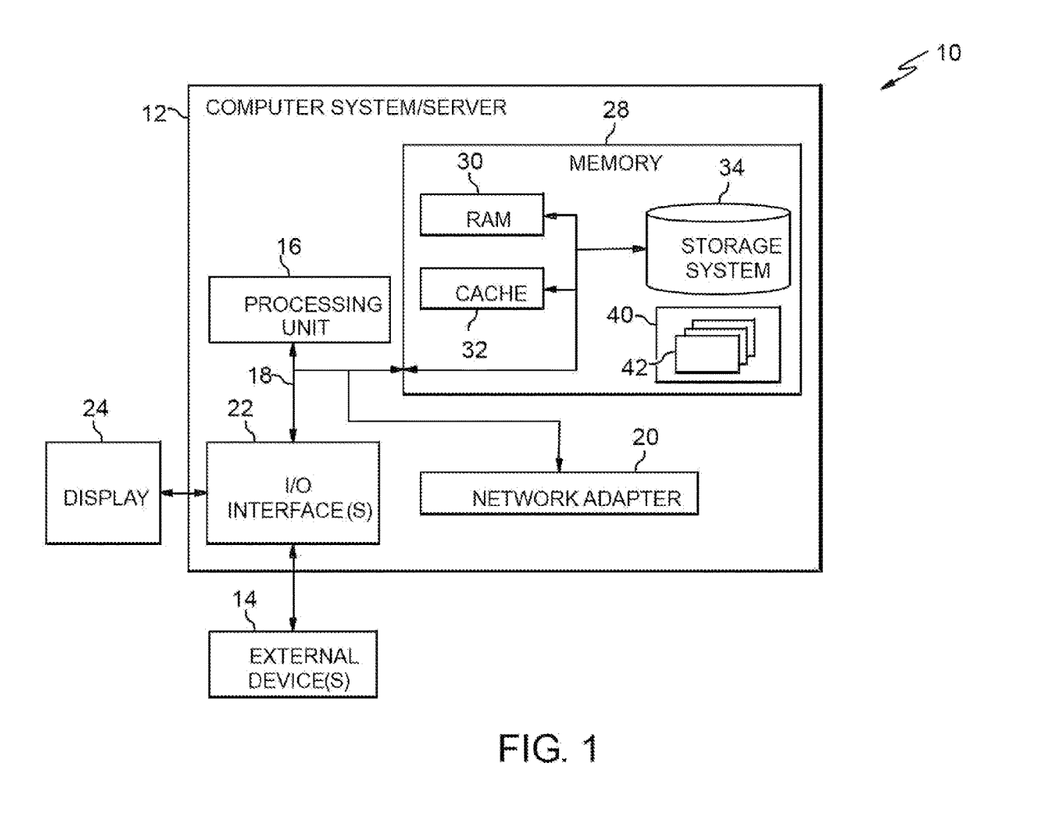
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
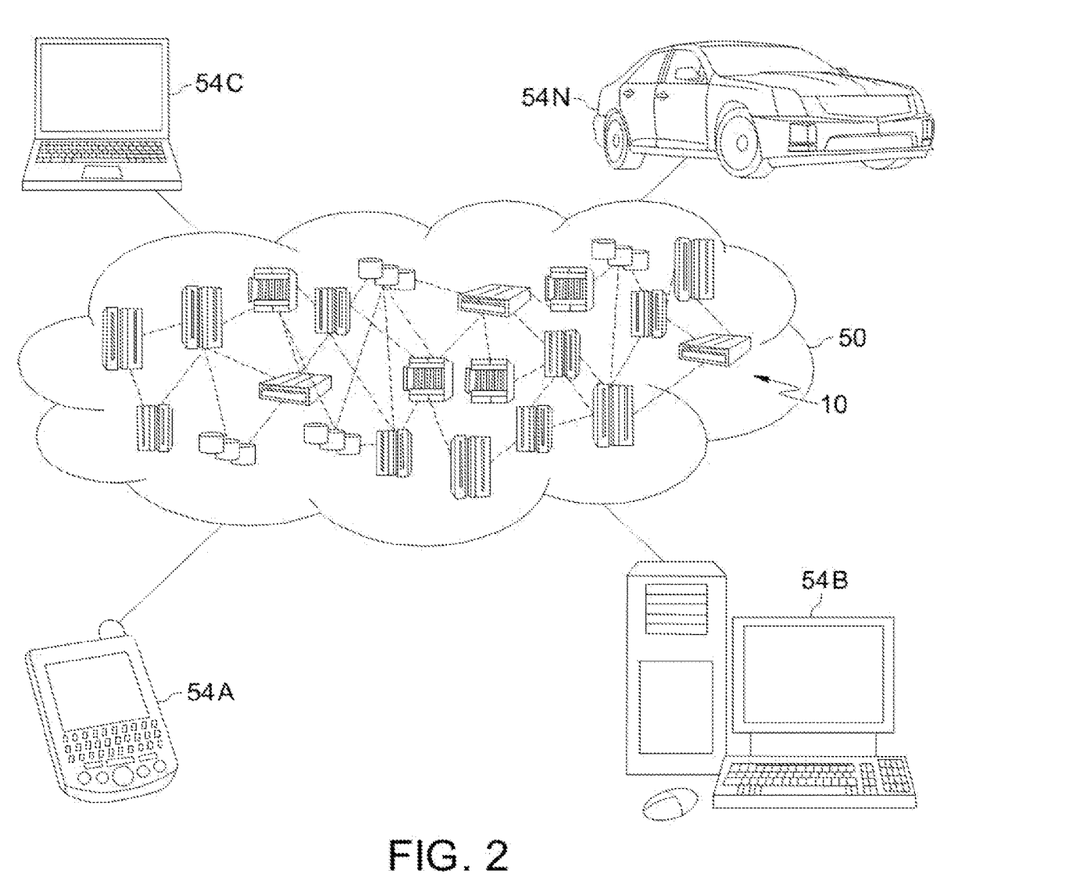
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
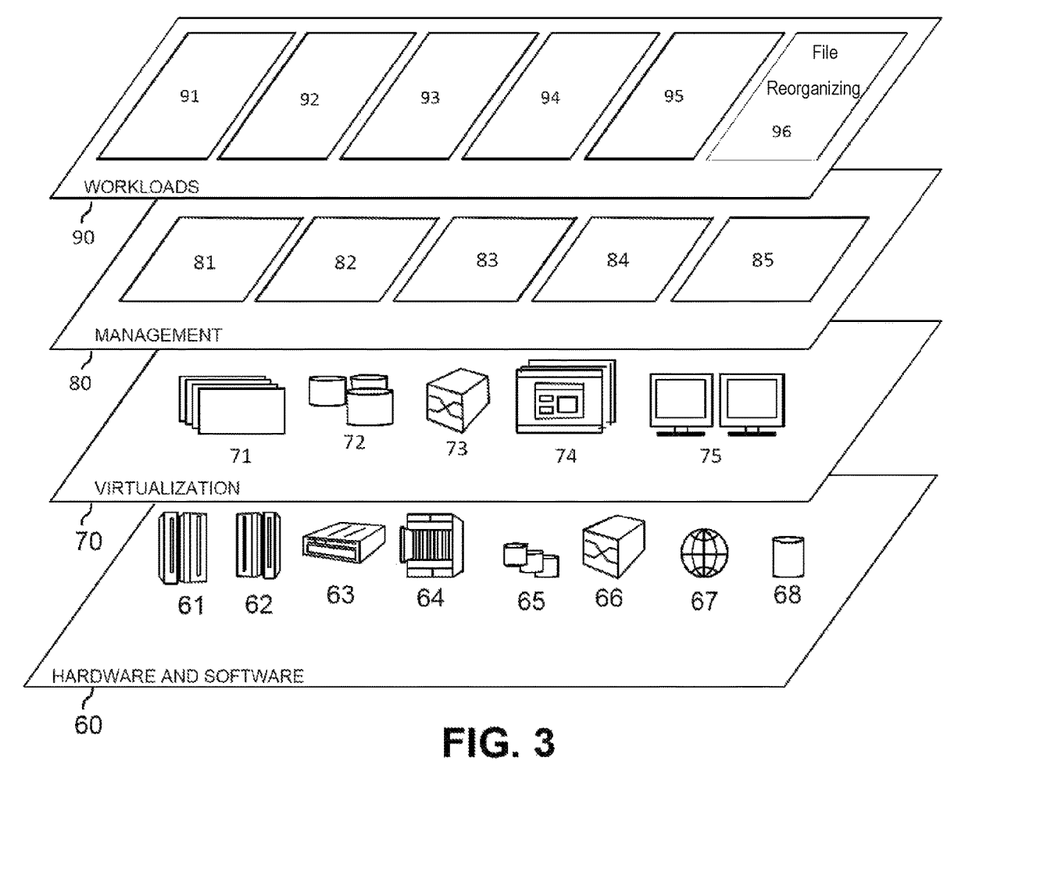
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file reorganizing 96.

Implementations of the invention may include a computer system/server 12 of FIG. 1 in which one or more of the program modules 42 are configured to perform (or cause the computer system/server 12 to perform) one of more functions of the file reorganizing 96 of FIG. 3. For example, the one or more of the program modules 42 may be configured to: a) execute a reorganization command within an environment; b) monitor unprocessed replication transactions within the environment; c) determine whether the unprocessed replication transactions exceed a threshold; d) in response to replication transactions exceeding a threshold, pause the executing the reorganization command; and e) in response to the replication transactions not exceeding the threshold, continue the executing the reorganization command.

Figure 4:
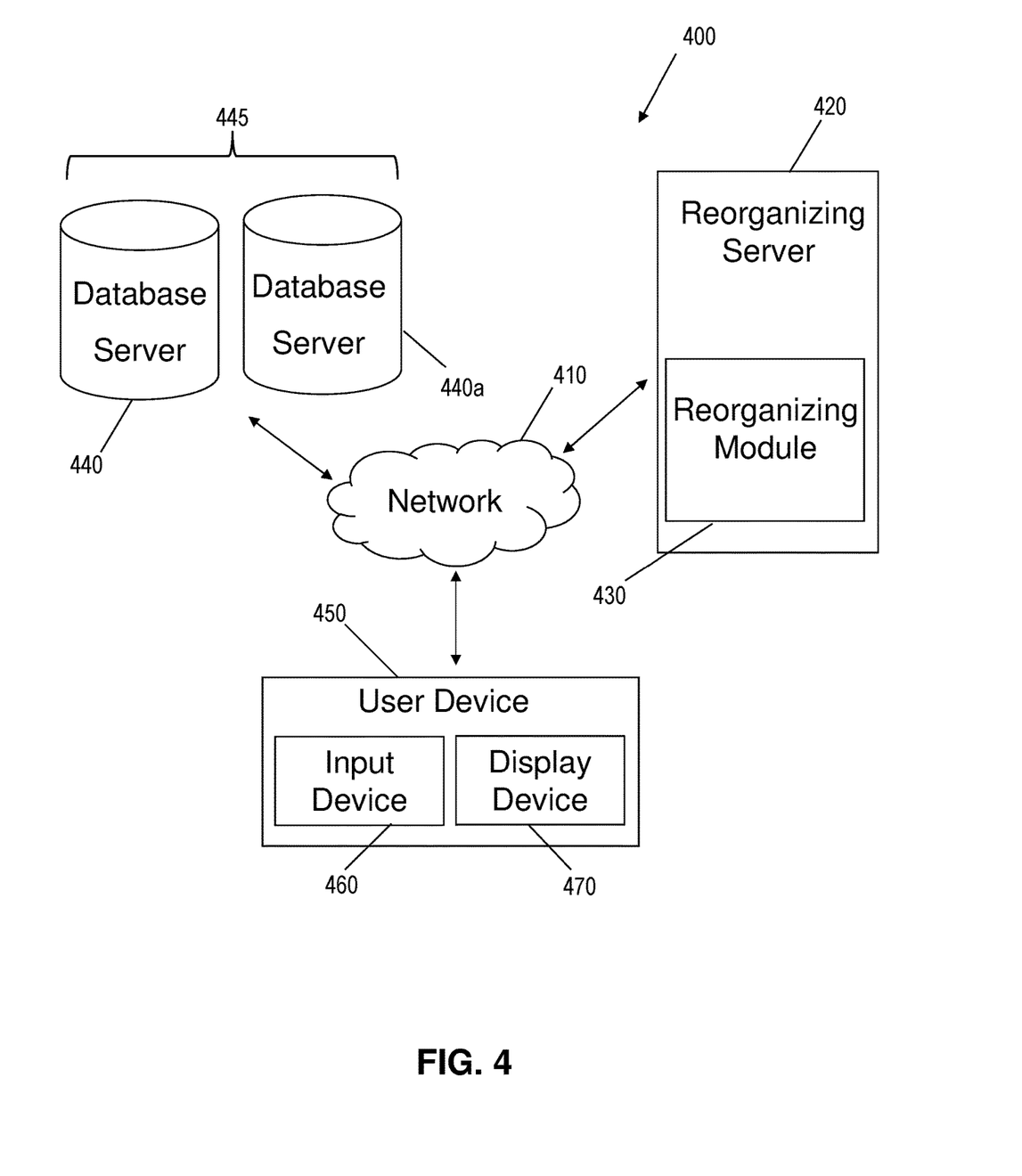
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, a reorganizing server 420, database servers 440, 440a, and a user device 450. The reorganizing server 420 is a computing device comprising one or more components of computer system/server 12 of FIG. 1. In embodiments, the database servers 440, 440a represent a high availability environment 445. In embodiments, a high availability environment 445 indicates an environment where there is a replication of database records across multiple database servers, i.e., database servers 440, 440a. In this way, a high availability environment 445 is a database server environment which replicates data from one system, i.e., database server 440, to other system, i.e., database server 440a.

In embodiments, the user device 450 may be a smartphone, laptop computer, desktop computer, smart watch, tablet computer, for example, and comprises one or more components of computer system/server 12 of FIG. 1. In embodiments, the user may be a database engineer, a database developer, or any other database professional. In embodiments, the user device 450 includes an input device 460 and a display device 470. In embodiments, the input device 460 includes a mouse, a keyboard, and a microphone, amongst other input device examples. In embodiments, the display device 470 is a screen which displays information on the user device 450 to a user of the user device 450.

In embodiments, the reorganizing server 420 comprises a reorganizing module 430, which comprises one or more program modules such as program modules 42 described with respect to FIG. 1. The reorganizing server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

In embodiments, relatively large database servers, i.e., database servers 440, 440a tend to have relatively large physical files. Further, in the high availability environment 445, there is a replication of data from database server 440 to database server 440a. In embodiments, since each data transaction requires replication, even though replication is performed on high performance networks, the data transactions can take a specific amount of time, e.g., a number of milliseconds, to reach another system, e.g., database server 440a. Accordingly, maintaining relatively large physical files residing in the high availability environment 445 can be relatively challenging. In embodiments, the larger the file, the larger number of replication transactions can grow exponentially due to managing indexes of data (views by keyed fields).

In embodiments, the relatively biggest challenge in the high availability environment 445 is managing deleted records of the physical files. In embodiments, the database servers 440, 440a mark a record as deleted when an application deletes the record. However, the deleted record still exists in the physical file in case the deleted record needs to be recalled. Although this recall feature allows for protection of data, this recall feature can cause significant performance problems in the database servers 440, 440a if there is no continuous maintenance of the deleted records. The number of deleted records, if proper maintenance does not occur, can double or triple the number of actual data records within the physical files.

In embodiments, a reorganization command, e.g., a reorganize physical file member (RGZPFM) command, reorganizes records within a physical file so that the deleted records are moved to an end of the physical file. In embodiments, the records at the end of the physical file are eventually physically deleted from the physical file. However, the reorganization command is not always in use frequently enough to maintain relatively large physical files. Accordingly, eventually the relatively large files get to the point where they are unmanageable if there are too many deleted records to manage.

In embodiments, the reorganization command, due to architecture of the database servers 440, 440a, sorts (moves) records before running record deletes. However, the move transactions can amount to tens of thousands of transactions for one specific record delete. Further, if the reorganization command is run during normal business hours while an application is still running, these thousands of transactions can cause a bottleneck such that the entire replication status of high availability environment 445 can be behind by hours and in some cases days. Accordingly, running a reorganization command on relatively large physical files in a replication environment can be relatively challenging. Typically, high availability environment administrators try to manually chip away at large physical files by running reorganization commands temporarily, followed by ending the reorganize process. But due to this manual nature, reorganization of the physical files does not get performed frequently enough and the number of records marked for deletion still continues to grow.

In embodiments, the reorganizing module 430 begins reorganizing the records within the physical files by executing a reorganization command. In embodiments, the reorganization command is a RGZPFM command which moves records of the physical file marked for deletion to the end of the physical file. In embodiments, a user sends instructions from the user device 450 to the reorganizing module 430 to execute the reorganization command using the input device 460. In this way, executing the reorganization command is in response to receiving instructions from the user device 450. In embodiments, the reorganizing module 430 receives the instructions from the user device 450 through the network 410.

In embodiments, the instructions from the user device 450 to the reorganizing module 430 are in a format which includes a file name. In embodiments, the file name is in the form of "IRGZPFM FILE(PFLIB/PFFILE)," with "FILE" specifying a database library within the database servers 440, 440a which contains the physical file which needs reorganizing. Further, "PFLIB/PFFILE" indicates the physical file name of the file that needs reorganizing. In embodiments, the format of the instructions also specifies a physical file member by indicating "MBR."

In embodiments, the instructions from the user device 450 also instruct the reorganizing module 430 to use replication software application programming interfaces (APIs) to detect unprocessed replication transactions in the high availability environment 445. In embodiments, the replication software APIs include software which monitors replication transactions for replicating file data across the database servers 440, 440a. Specifically, a replication transaction is a replication of file data from the database server 440 to the database server 440a. In embodiments, unprocessed replication transactions are replication transactions which have yet to replicate file data across the database servers 440, 440a because the replication transaction requires further computing resources. Accordingly, the reorganizing module 430 uses replication software APIs to monitor file unprocessed replication transactions within the high availability environment 445. Specifically, the reorganizing module 430 determines whether there are unprocessed replication transactions from the monitoring from using the replication software APIs.

In embodiments, the instructions instruct the reorganizing module 430 to temporarily pause the RGZPFM command in response to a number of unprocessed replication transactions exceeding an unprocessed transaction threshold. In embodiments, the unprocessed replication transaction threshold represents a threshold for a number of unprocessed replication transactions. In embodiments, the instructions regarding the operation of the reorganization command are in the form of "DLYRGZ(*YES, *NO)," with a determination of "YES" by the reorganizing module 430 indicating that a number of unprocessed replication transactions exceed the threshold. In response to making this determination, the reorganizing module 430 pauses the RGZPFM command because a number of unprocessed replication transactions exceed the threshold. In embodiments, using the replication software APIs, the reorganizing module 430 determines when a number of the unprocessed replication transactions is equal to zero. In response to determining the number of the unprocessed replication transactions is equal to zero, the reorganizing module 430 releases the pause on the reorganization command.

Alternatively, if the reorganizing module 430 determines the number of unprocessed replication transactions does not exceed the threshold, the reorganizing module 430 makes the determination of "NO." In response to the "NO" determination, the reorganizing module 430 does not pause the RGZPFM command because the number of unprocessed replication transactions does not exceed the threshold. In this way, by using replication software APIs, the reorganizing transactions from the reorganization command do not impact normal business activity since the reorganizing module 430 pauses the reorganization command once the number of unprocessed replication transactions exceed the threshold of unprocessed replication transactions.

In embodiments, if "DLYRGZ" is "YES," the instructions further include the instruction of "DLYDG," which specifies a data group of the physical file. In embodiments, the format of the instructions further include that if "DLYRGZ" is "YES," then there is a threshold instruction "DGTHRSH," which instructs the reorganizing module 430 to pause the reorganization command activity until the number of unprocessed replication transactions returns back to zero. In embodiments, the reorganizing module 430 determines whether the unprocessed replication transactions exceed a threshold by keeping count of a number of the unprocessed transactions using the replication software APIs and comparing the number of the unprocessed transactions to a threshold. As an example, the threshold is equal to 500000 unprocessed replication transactions, i.e., "DGTHRSH (500000)." As a more specific example, the reorganizing module determines the number of unprocessed replication transactions exceeds 500000. In response to determining that the number of unprocessed replication transactions exceed the threshold, the reorganizing module 430 pauses the reorganization command using the DGTHRSH command until the number of unprocessed replication transactions returns back to zero. In this way, the reorganizing module 430 pauses the reorganization command in response to replication activity exceeding a threshold.

In embodiments, the instructions from the user device 450 also include instructions for a maximum amount of predefined time and a minimum amount of predefined time for the reorganizing module 430 to run the reorganization command. As an example, "MAXMINS(*NOMAX)" indicates that the reorganizing module 430 runs the reorganization command until the user device 450 forcefully ends the reorganization command. In this way, the reorganization command runs for a predefined amount of time. In embodiments, the instructions further include the instruction "NBRTASKS" which indicate the number of tasks the reorganizing module 430 uses to run the reorganization command. As an example, the instruction "NBRTASKS(2)," instructs the reorganizing module 430 that two tasks will run the reorganization command. In embodiments, the reorganize module 430 uses symmetric multiprocessing if the instructions instruct more than one task to run the reorganization command. In embodiments, the symmetric multiprocessing allows for the reorganization command to be performed relatively faster by using multiple threads while running SQL routines. Alternatively, if symmetric multiprocessing is not available, the reorganizing module 430 uses only one task to process the reorganization command.

Figure 5:
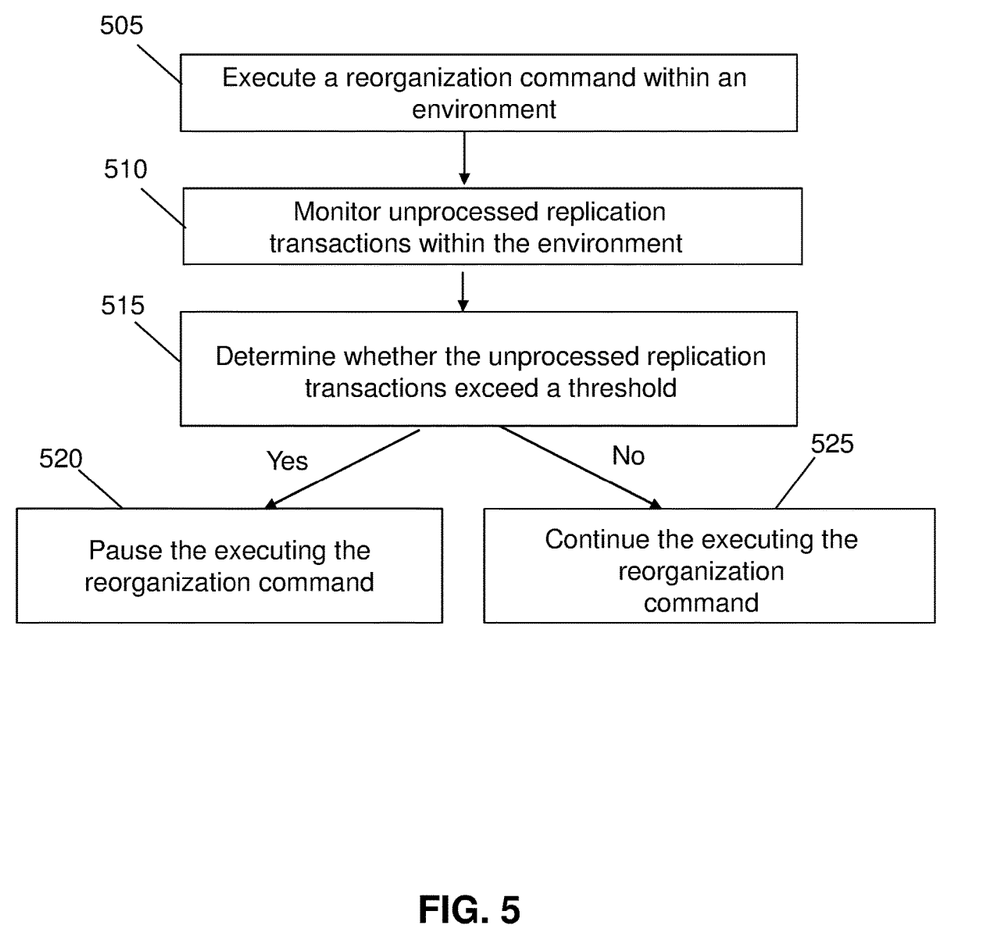
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system executes a reorganization command within an environment. In embodiments, and as described with respect to FIG. 4, the reorganizing module 430 receives instructions from a user device 450 to run the reorganization command in a high availability environment 445. In embodiments, the reorganization command is a RGZPFM command.

At step 510, the system monitors unprocessed replication transactions within the environment. In embodiments, and as described with respect to FIG. 4, the reorganizing module 430 uses replication software APIs that include software which monitors unprocessed replication transactions within the high availability environment 445.

At step 515, the system determines whether the unprocessed replication transactions exceed a threshold. In embodiments, and as described with respect to FIG. 4, the reorganizing module 430 keeps count of a number of unprocessed replication transactions from the monitoring the unprocessed replication transactions and compares the number of unprocessed replication transactions to a threshold.

At step 520, in response to determining the unprocessed replication transactions exceed the threshold, the system pauses the executing the reorganization command. In embodiments, and as described with respect to FIG. 4, the reorganizing module 430 temporarily pauses the reorganization command when there is a determination of "YES" by the reorganizing module 430 that a number of unprocessed replication transactions exceed the threshold.

At step 525, in response to determining the unprocessed replication transactions do not exceed the threshold, the system continues executing the reorganization command. In embodiments, and as described with respect to FIG. 4, the reorganizing module 430 continues executing the reorganization command when there is a determination of "NO" by the reorganizing module 430 that a number of unprocessed replication transactions do not exceed the threshold.

Figure 6:
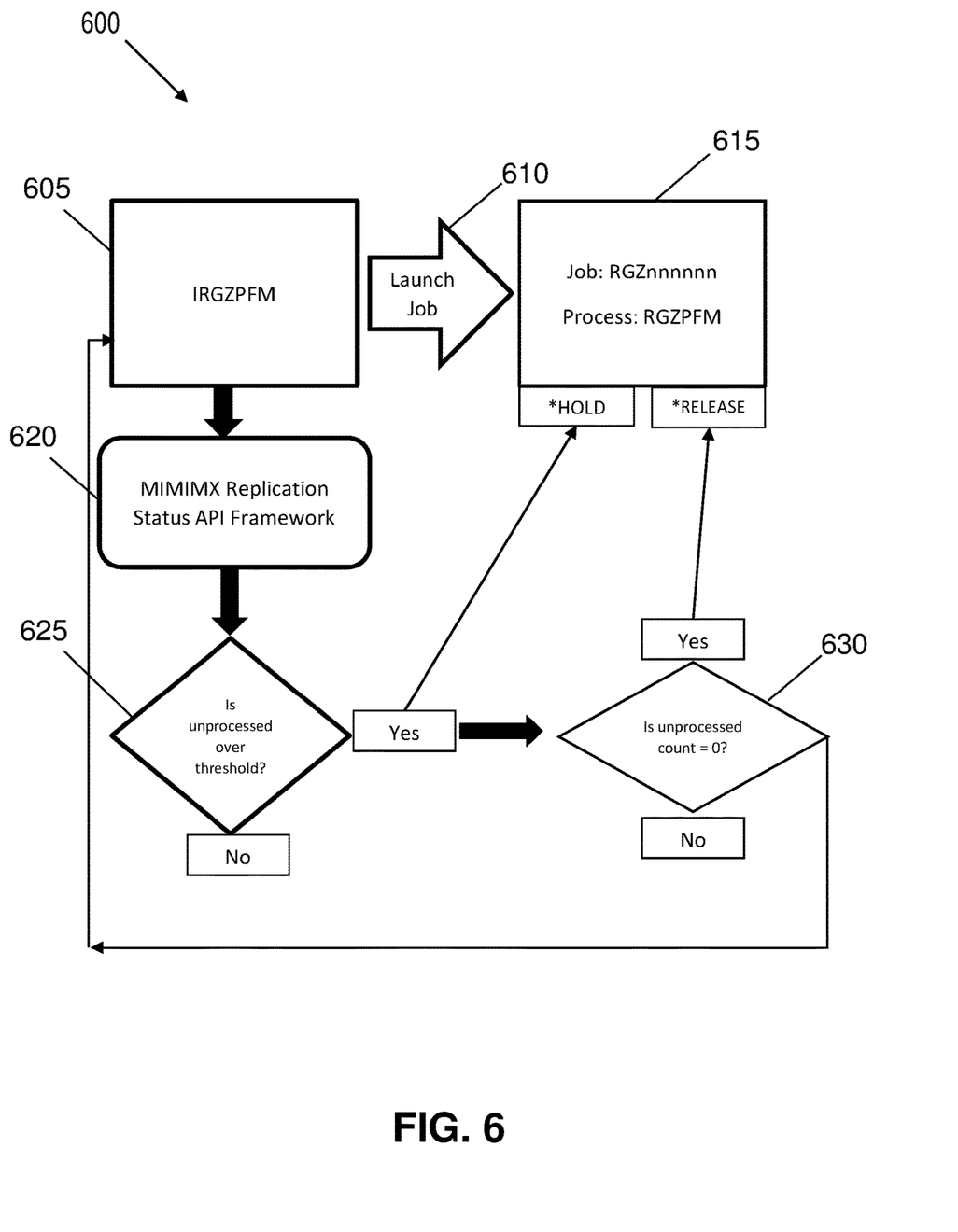
FIG. 6 shows an exemplary use in accordance with aspects of the invention.

FIG. 6 shows an exemplary use in accordance with aspects of the present invention and is described with reference to elements depicted in FIG. 4. In embodiments, FIG. 6 illustrates a reorganization 600 of physical files within the high availability environment 445. In embodiments, the reorganization 600 includes a process 605 having a name of "IRGZPFM." In embodiments, the "IRGZPFM" process 605 enables a running of the reorganization command 615 in a manner that pauses the execution of the reorganization command 615 automatically once the reorganizing module 430 determines unprocessed replication transactions exceed a threshold 625. In embodiments, the process 605 begins by receiving instructions from the user device 450 to launch a job 610 having a name of "RGZnnnnnn." In embodiments, the job 610 includes executing the reorganization command 615, i.e., "RGZPFM." In embodiments, the reorganization 600 includes replication software APIs 620 having a name of "MIMIMX," which monitor unprocessed replication transactions. In embodiments, if the unprocessed replication transactions are over a threshold 625, the reorganizing module 430 places the job 610 on "HOLD," thereby pausing the reorganization command 615. The "HOLD" continues until there is a determination 630 that the number of unprocessed replication transactions is equal to zero. In response to the determination 630 that the number of unprocessed replication transactions is equal to zero, the reorganizing module 430 releases, i.e., "RELEASE" the "HOLD" so that the reorganization 600 begins again by launching the job 610. Alternatively, if the unprocessed replication transactions are not over the threshold 625, the reorganizing module 430 continues executing the reorganization command 615.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
executing, by a computing device, a reorganization command within an environment;
monitoring, by the computing device, unprocessed replication transactions within the environment;
determining, by the computing device, whether the unprocessed replication transactions exceed a threshold; and
pausing, by the computing device, the executing the reorganization command in response to determining the unprocessed replication transactions exceed the threshold,
wherein the reorganization command reorganizes a physical file by moving records of the physical file marked for deletion to an end of the physical file.

2. The method of claim 1, wherein the reorganization command is a reorganize physical file member (RGZPFM) command.

3. The method of claim 1, wherein the reorganization command reorganizes a physical file within the environment.

4. The method of claim 1, wherein the environment is a high availability environment.

5. The method of claim 1, further comprising determining a number of the unprocessed replication transactions is equal to zero.

6. The method of claim 5, further comprising releasing the pausing on the executing the reorganization command in response to determining the number of the unprocessed replication transactions is equal to zero.

7. The method of claim 1, wherein the environment includes a plurality of database servers.

8. The method of claim 1, wherein the reorganization command runs for a predefined amount of time.

9. The method of claim 1, wherein the monitoring the unprocessed replication transactions includes using replication software application programming interfaces (APIs) detecting the unprocessed replication transactions.

10. The method of claim 1, wherein the executing the reorganization command is in response to receiving instructions from a user device.

11. The method of claim 1, wherein the computing device includes software provided as a service in a cloud environment.

12. A computer program product comprising one or more computer readable storage media having program instructions collectively stored on the one or more computer readable storage media, the program instructions executable are executed to:
execute a reorganization command within an environment;
monitor replication transactions within the environment during the executing the reorganization command;

determine whether there are unprocessed replication transactions from the monitoring; determine whether the unprocessed replication transactions exceed a threshold; and continue the executing the reorganization command in response to determining the unprocessed replication transactions do not exceed the threshold, wherein the reorganization command reorganizes a physical file by moving records of the physical file marked for deletion to an end of the physical file.

13. The computer program product of claim 12, wherein the environment is a high availability environment.

14. The computer program product of claim 12, wherein the reorganization command is a reorganize physical file member (RGZPFM) command.

15. The computer program product of claim 12, wherein the reorganization command runs for a predefined amount of time.

16. A system comprising: a processor, a computer readable memory, one or more computer readable storage media, and program instructions collectively stored on the one or more computer readable storage media, the program instructions are executed to:

execute a reorganization command within an environment;

monitor unprocessed replication transactions within the environment;

determine whether the unprocessed replication transactions exceed a threshold;

pause the executing the reorganization command in response to determining the unprocessed replication transactions exceed the threshold; and continue the executing the reorganization command in response to determining the unprocessed replication transactions does not exceed the threshold, wherein the reorganization command reorganizes a physical file within the environment by moving records of the physical file marked for deletion to an end of the physical file.

17. The system of claim 16, wherein the environment includes a plurality of database servers.

18. The system of claim 16, wherein the reorganization command is a reorganize physical file member (RGZPFM) command.

* * * * *